United States Patent [19]

Ubriaco

[11] Patent Number: 4,568,938
[45] Date of Patent: Feb. 4, 1986

[54] RADAR ALTIMETER NEAREST RETURN TRACKING

[75] Inventor: Thomas A. Ubriaco, Cedar Rapids, Iowa

[73] Assignee: Rockwell International Corporation, El Segundo, Calif.

[21] Appl. No.: 330,735

[22] Filed: Dec. 14, 1981

[51] Int. Cl.[4] .............................................. G01S 13/32
[52] U.S. Cl. ................................. 343/12 R; 343/5 FT; 343/5 SA; 343/12 A
[58] Field of Search ................. 343/12 A, 5 FT, 5 W, 343/17.5, 7.5, 14, 10, 12 R, 9, 5 SA; 367/102

[56] References Cited

U.S. PATENT DOCUMENTS

| | | | |
|---|---|---|---|
| 3,577,143 | 5/1971 | Poirier et al. | 343/12 R |
| 3,603,990 | 9/1971 | Poirier | 343/12 R |
| 3,819,920 | 6/1974 | Goldfischer | 343/9 |
| 4,107,679 | 8/1978 | Strauch et al. | 343/7.5 |
| 4,185,285 | 1/1980 | Bosc | 343/5 SA |
| 4,268,828 | 5/1981 | Cribbs et al. | 343/5 FT |
| 4,271,412 | 6/1981 | Glass et al. | 343/5 FT |
| 4,310,903 | 1/1982 | Kay | 367/102 |
| 4,389,649 | 6/1983 | Parkhurst et al. | 343/17.5 |
| 4,435,709 | 3/1984 | Kipp | 343/12 R |
| 4,509,049 | 4/1985 | Haendel et al. | 343/14 |

Primary Examiner—Salvatore Cangialosi
Assistant Examiner—K. R. Kaiser
Attorney, Agent, or Firm—George A. Montanye; H. Fredrick Hamann

[57] ABSTRACT

An FMCW distance measuring device is disclosed which enables increased accuracy by detecting the nearest return. A portion of the transmitted wave in an FMCW altimeter is mixed with the received signal indicating distance to ground to produce a beat frequency between the transmitted wave and the received wave. The beat frequency is a spectrum of frequencies, the lowest of which indicates the nearest return in a target area. The beat frequency spectrum is coupled for sampling by an analog-to-digital converter and then coupled to an apparatus for performing a Fast Fourier Transform to isolate the nearest return. In an altimeter, the Fast Fourier Transform of the return spectrum enables the FMCW radar to have an accuracy approaching that of pulsed radars without the associated disadvantages.

10 Claims, 3 Drawing Figures

RADAR ALTIMETER NEAREST RETURN TRACKING

BACKGROUND OF THE INVENTION

The present invention relates to distance measuring apparatus and more particularly to FMCW altimeters and height measuring systems.

As is well known, there are generally two types of radar distance measuring systems, one known as pulsed radar and the other as FMCW. In the pulsed radar technique, a series of RF pulses are transmitted towards a desired target and a receiver is operated to detect the return of the transmitted pulses as they are reflected from the target. The time delay between the transmitted and received pulses is proportional to the distance to the target. By accurately controlling the transmission and detection of such pulses, highly accurate information can be obtained with respect to distance to the target.

In an FMCW distance measuring system, a continuous RF signal is repetitively swept by a frequency modulating signal and the resulting modulated carrier is transmitted toward a target. The FM signal is reflected by the target and returned towards the transmitter for reception. A portion of the transmitted signal is mixed with the reflected signal to produce a beat frequency indicative of the distance from the transmitter to the target. By controlling the modulation of the transmitted signal and by detecting the beat frequency, accurate readings of the distance to a target can be determined.

While each of the above techniques can give an indication of distance to a target, each technique has its own limitations. For example, the pulsed radar technique enables easy detection and tracking of the nearest return thereby providing easy detection of altitude or height changes when used as an altimeter. The pulsed technique, however, requires high transmitter power and large receiver bandwidth and is normally confined to a specific frequency which enables easy jamming in a hostile environment. In addition, the high power solid-state RF devices which are needed to generate the high power RF pulses are not as readily available as lower power devices. Further, at lower altitudes, it is difficult to generate and detect the pulses necessary to make accurate readings. In automatic landing systems, this becomes a problem since accuracy at low altitudes is essential for proper control.

In contrast, the FMCW technique enables distance measuring with a low power transmitter and a narrow bandwidth receiver. Because the signal is continuously modulated or swept in frequency, it is less likely to be affected by jamming techniques. In addition, the cost and complexity is substantially reduced by the ready availability of low power solid-state RF devices. By relying on the beat frequency produced by the mixing of the transmitted and received signal, however, the accuracy of the measurement is reduced. Specifically, the beat frequency produced by FMCW returns is not a single frequency but a spectrum of beat frequencies indicative of reflections received from a target area. Conventional detection circuits produce readings which are the average of the spectrum of beat frequencies rather than the nearest return. While this averaging is helpful in automatic landing systems, it does not provide high resolution for ground or terrain avoidance systems where pop-up targets are likely to occur. The FMCW technique has therefore been used for automatic landing systems and low altitude measurements, while the pulsed technique has been used at high altitudes or where accurate target distance is required.

In the prior art, a variety of systems have been developed to improve the accuracy of the distance measuring provided by FMCW apparatus. These techniques attempted to improve frequency discrimination and modulation non-linearities in order to more accurately control the beat frequencies. Other techniques attempted to sweep over a range of beat frequencies and selectively filter the frequencies in order to more accurately determine individual frequencies indicating nearest returns. Such attempts, however, have met with limited success since the filter characteristics and sweep time for altitude determination are prohibitive over the desired range of altitudes. Accordingly, the only effective compromise has been to include both a pulsed radar and FMCW radar to obtain the benefits of each during anticipated use.

As can be seen, if the accuracy of an FMCW radar could be improved to detect nearest returns, its use in more environments would be facilitated. The present invention has therefore been developed to improve that accuracy and to overcome the limitations of the above known and similar techniques.

SUMMARY OF THE INVENTION

The present invention relates to an FMCW radar altimeter which enables more accurate detection and tracking of the nearest return. The system includes a modulated RF carrier signal transmitted towards a target area which in turn reflects the transmitted signal. A portion of that transmitted signal is mixed with the detected reflected signal to produce a beat frequency spectrum. The beat frequency spectrum is sampled by an analog-to-digital converter to produce a plurality of discrete digitized outputs representative of the received spectrum. The digitized output is analyzed by performing a Fast Fourier Transform which converts the spectrum from the time to frequency domain and provides discrete outputs of the signal return. The lowest frequency in that spectrum can thereby be detected as an indication of the nearest return (distance) from the target area. The nearest return can additionally be used to control the modulation frequency so that the resolution of the altimeter system is constant with altitude.

It is therefore a feature of the present invention to provide an improved and more accurate FMCW distance measuring system.

It is a further feature of the invention to provide an FMCW distance measuring system which more accurately determines nearest distance to a target area.

Still another feature of the invention is to provide an FMCW distance measuring device which utilizes a Fast Fourier Transform to provide an indication of the nearest return.

Yet another feature of the invention is to provide an FMCW altimeter which analyzes the spectral distribution of the beat frequency to detect the lowest frequency return.

Another feature of the invention is to provide an FMCW distance measuring system which uses a Fast Fourier Transform to control system modulation for improving resolution over a large range of altitudes.

These and other advantages and novel features of the invention will become apparent from the following detailed description when considered with the accompanying drawings wherein:

DETAILED DESCRIPTION OF A PREFERRED EMBODIMENT

Figure 1:
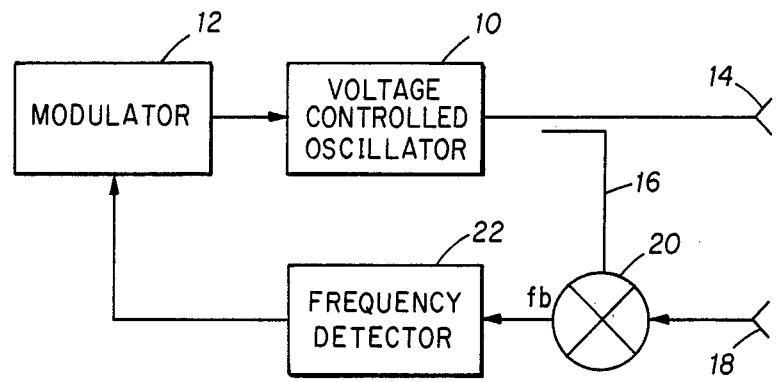
FIG. 1 is a schematic diagram showing an FMCW system known in the prior art.

Referring now to the drawings, wherein like numerals are used to refer to like elements throughout, FIG. 1 shows a typical FMCW distance measuring system as is commonly known in the prior art. The system generally includes a frequency generator 10 which is typically a voltage controlled oscillator which provides a variable high frequency output about a center point frequency in response to a varying input voltage. The varying input voltage can be provided by a modulator 12 which is designed to linearly sweep the frequency transmitted by generator 10 about its center point. The modulator 12 may provide a ramp or triangular wave output voltage, the slope of which is controlled in a feed-back loop as will be subsequently described. The output of the generator 10 is coupled to a transmitting antenna 14 which is positioned to beam the generated signal towards a target. In the present instance, the system will be described with respect to its use as an altimeter system in which the transmitter and the antenna are located in an aircraft above a ground target.

The transmitted high frequency from generator 10 is directed by antenna 14 to the ground area and a reflected signal is received by a second antenna 18 and coupled to a mixer 20. A portion of the output of generator 10 is coupled by coupler 16 (which may be a conventional directional coupler) as a second input to the mixer 20. The mixer 20 thereafter provides an output $f_b$ which is known as a difference signal or a beat frequency. The beat frequency is coupled to a frequency detector 22 which is in turn coupled to control modulator 12. In one prior art technique, the modulator 12 is operated to control the slope of the ramp voltage to maintain the beat frequency at the output of mixer 20 constant. The altitude is then measured by specific relationship between the beat frequency, slope and time period of the modulation waveform. Reference may be made to U.S. Pat. Nos. 4,107,679 and 4,276,549 as examples of the above conventional circuits as well as to the article entitled "Area Target Response of Triangularly Frequency-Modulated-Continuous-Wave Radars" in the *IEEE Transactions on Aerospace and Electronic Systems*, Volume AES-14, No. 2, March 1978, pages 266+.

In altimeters using the above known FMCW radar techniques, a frequency counter is normally used to count the beat frequency or frequency difference between the transmitted and received signal. In operation, however, the beat frequency produced by the mixer 20 is not a single frequency but is a return spectrum of different frequencies corresponding to different distances to objects on the ground. The counter thus counts the average frequency of the return spectrum rather than providing an output based on only one frequency. The response of the altimeters is therefore controlled by reference to an average frequency which prevents nearest return detection or nearest return discrimination.

In an attempt to enable the FMCW radar to operate similarly to a pulsed radar and provide the nearest return tracking, it is known to place a narrow bandwidth filter over the leading edge or lowest frequency of the return spectrum and thereafter count that lowest frequency. Using this count, the beat frequency can be held constant by changing the modulation frequency thus producing a narrow band, fixed frequency discriminator. In order to insure the narrow bandwidth of the system, however, and to make certain that the narrow bandwidth is at the leading edge or nearest return of the spectrum, the system must go into a periodic search mode from low to high altitude to check the return signals. The search mode takes time and changes in altitude require an extended time for target acquisition which is unacceptable in most applications. Such techniques have therefore not been successful in improving the capabilities of the FMCW radar as an altimeter system.

Figure 2:
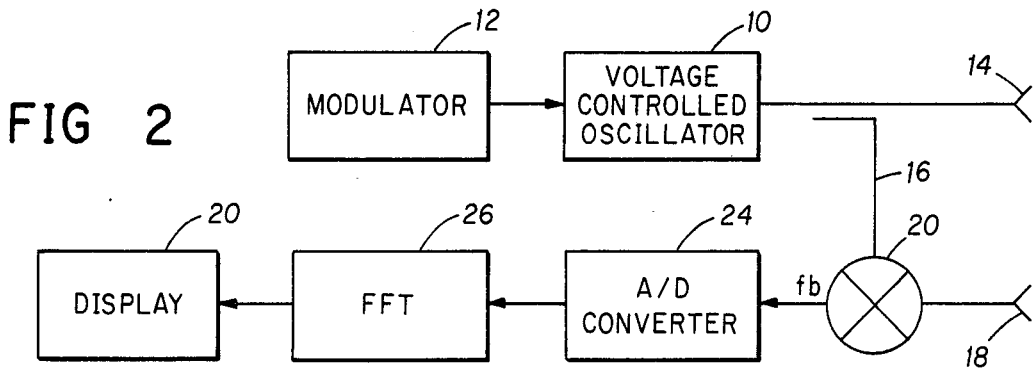
FIG. 2 is a schematic block diagram of an FMCW system employing the detection technique of the present invention.

In accordance with the present invention, the above disadvantages have been reduced by the use of the system shown in FIG. 2. In this instance, the modulator 12 controls the frequency generator 10 to transmit high frequency signals from antenna 14 as previously described in FIG. 1. Again, the coupler 16 provides a portion of that transmitted energy to mixer 20 which also receives reflected signals through receiving antenna 18. The difference of beat frequency $f_b$, provided as output from the mixer 20, is then coupled to an analog-to-digital converter 24 which samples and digitizes the return beat frequency spectrum. Any number of samples can be taken but the particular number should be set to provide a reasonably accurate output for most altimeter applications. The output of the analog-to-digital converter is then coupled to a device for performing a Fast Fourier Transform (FFT) which converts the digitized signal from 24 from the time to the frequency domain.

The Fast Fourier Transform provided at element 26 can be performed using a variety of known techniques as would be evident to one of ordinary skill in the art. The Fast Fourier Transform can be performed by a microcomputer in the altimeter apparatus, or alternatively by any other software or hardware scheme capable of making the requisite transformation. The Fast Fourier Transform may be done in real time or on a delayed basis, but the real time conversion is desired for flight operations. The transformation can be made with conventional software and microcomputer apparatus and the speed of the transformation will determine real or delayed time applications. The output of the Fast Fourier Transform is a spectrum of individual frequencies indicative of the returns from the target area. In this manner, the nearest return can be easily identified as the lowest frequency of the spectrum and distinguish the various altitudes or distances to target. As opposed to the conventional averaging of the beat frequencies, the present technique provides individual outputs which enable detection and display of the nearest return (nearest distance to target). The output of the FFT can thereafter be directed to a display device 28 for indicating the distance to objects in the target area within the view of the transmitting antenna 14.

In FIG. 2, the system has been shown in a free-running mode, wherein the modulator 12 is not controlled by any feedback from the transformation made in element 26. As will be understood, the resolution of this system changes as the altitude of the aircraft changes with respect to the ground target area. Thus as the height increases the resolution of the system decreases if it is maintained in a free-running state. While the system will still provide improved accuracy over prior art in detecting nearest returns, it is even more desirable to have a constant resolution over large ranges of altitudes.

Figure 3:
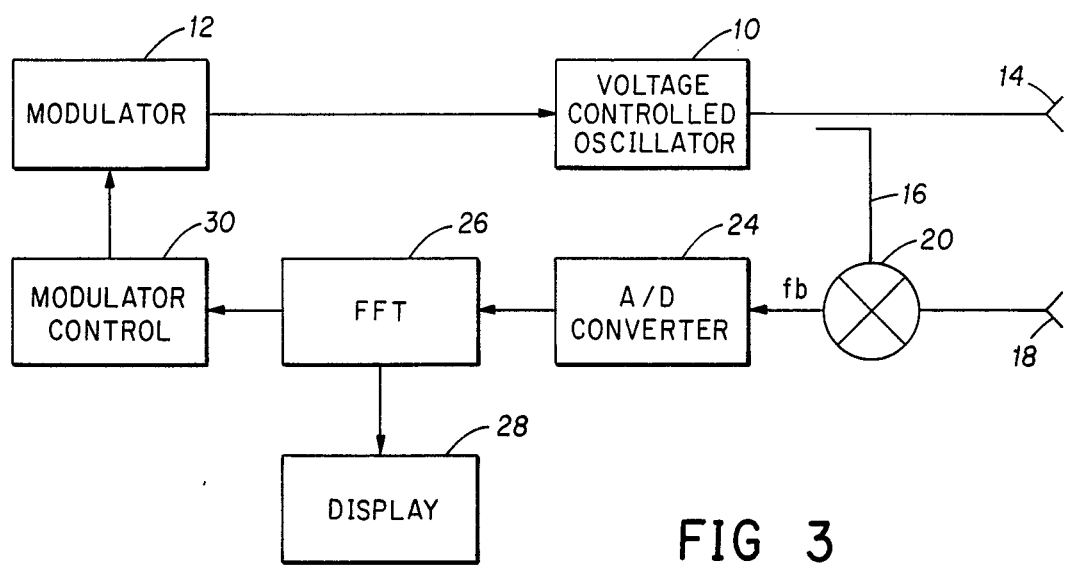
FIG. 3 is a schematic block diagram showing another embodiment of the present invention used in the control of FMCW resolution.

Accordingly, referring now to FIG. 3, another embodiment of the present invention is shown which enables system resolution to be maintained relatively constant over a large range of altitudes. In this system, the modulator 12 again provides a swept voltage control to frequency generator 10 for providing the transmitted output from antenna 14. The directional coupler 16 couples a portion of that transmitted energy through mixer 20 for mixing with a received signal at antenna 18 to produce the beat frequency output $f_b$. The spectrum of the beat frequencies is converted by analog-to-digital converter 24 and the digitized output is coupled to the Fast Fourier Transform device 26 which provides a readout of individual frequencies in the return spectrum. The altitude can be directly read from a display 28 as was described with reference to FIG. 2. In this embodiment, however, the output of the Fast Fourier Transform is also coupled to a modulator control 30 which is coupled to respond to the lowest return provided by the Fast Fourier Transform device 26 to control the slope of the voltage produced by the modulator 12. The modulator control 30 can be of any conventional construction capable of providing a feedback which is designed to drive the modulator 12 so that the frequency $f_b$ is constant. Such servo circuits are known in the prior art and will not be described in detail herein, it being understood that any circuit capable of achieving the modulator control will be acceptable.

As can be seen by reference to FIG. 3, the circuit will operate to change the slope of the modulating voltage so that the nearest return produces the constant beat frequency, $f_b$. As such, the resolution of the system will be constant as the altitude of the aircraft changes. The system will thus provide improved operation over a large range of altitudes and more particularly at high altitudes where prior FMCW systems were less desirable than pulsed systems.

In addition to the above, the continuous spectral monitoring of the present invention provides a means of monitoring system performance. In particular, there will be certain system characteristics which remain constant throughout the normal operation of the altimeter. For example, antenna leakage will appear in the return spectrum and can be monitored for normal operation. If there is a change in the system performance, or in the normal spectral return for the system, the system can be changed or modified to compensate for the changed performance. The continuous spectral monitoring also allows the system to be operated in one of two modes. Thus, the nearest return may be viewed for high and low altitude distance accuracy, similar to the information provided by pulsed radar returns. Alternatively, the spectral output from the Fast Fourier Transform device may be coupled to provide an average of the return frequencies located within that spectrum. In this manner, the FMCW may be used to accomplish its auto-landing benefits with only minor additional modifications and without the requirement of two separate radar altimeters. The present system thus incorporates the advantages of both the pulsed and FMCW radars into one FMCW radar technique.

In accordance with the above technique, the present system provides an FMCW radar altimeter which provides an inherent search and track function. The spectrum analysis performed by the Fast Fourier Transform looks at the frequencies over the frequency range between the one being tracked and lower frequencies as the Transform is being performed. The spectral distribution thus varifies the lowest frequency representing nearest return. If the spectral distribution shows that the lowest frequency is not being tracked, the modulator control 30 may be used to adjust the modulation so that the lowest frequency return produces the constant frequency $f_b$.

As can be seen from the above description, the present technique provides an improved FMCW distance measuring system which improves accuracy in making nearest return measurements while retaining the benefits of FMCW techniques. The system provides flexibility of enabling the altimeter system to be used in auto-landing and high-altitude environments without complex structures. The low power, narrow bandwidth, closed loop tracking using swept frequencies reduces the cost and complexity of many of the system components and allows selectivity in system performance. These are all advantages not shown or taught by the prior art.

While the system has been described with reference to particular elements, it is obvious that other equivalent devices may be used. Obviously many other modifications and variations of the present invention are possible in light of the above teachings. It is therefore to be understood that within the scope of the appended claims, the invention may be practiced otherwise than as specifically described.

What is claimed is:

1. A distance measuring apparatus comprising;
    means for providing a linear modulating signal;
    means responsive to said linear modulating signal for generating a linearly variable frequency output signal;
    means for transmitting said variable frequency signal to a target;
    means for receiving a return spectrum of said variable frequency signal reflected from said target;
    means for mixing a portion of said variable frequency signal with said received reflected signal to produce a beat frequency spectrum;
    analog-to-digital converter means for converting said beat frequency spectrum to a digital output;
    Fast Fourier Transform means for transforming said digital output to individual frequency outputs each representative of a distance to the target; and
    means responsive to said Fast Fourier Transform means for displaying each of said frequency outputs as a distance to the target.

2. In an FMCW radar distance mesuring system including a modulator, a frequency generator for generating a variable frequency output in response to said modulator, a transmitter for transmitting said variable frequency to a target, a receiver receiving a reflected signal from said target, and a means coupled to mix transmitted and received energy to produce an analog beat frequency spectrum output, the improvement comprising:
    means for converting said analog beat frequency output to a digital output representative of individual frequencies of said beat frequency spectrum; and Fast Fourier Transform means for converting said digital output to individual frequency readings indicative of target distance.

3. The apparatus of claim 2 further including means responsive to said Fast Fourier Transform means for displaying the lowest frequency in said detected spectrum as the nearest target distance.

4. In an FMCW radar distance measuring system having a means for transmitting a variable frequency signal to a target and means for receiving and outputting a frequency spectrum relating to the range of the target, the improvement comprising:

Fast Fourier Transform means coupled to detect said frequency spectrum and provide an output representing at least the lowest frequency in said spectrum; and means coupled to the output representing at least the lowest frequency in said spectrum for displaying the frequency output as a measure of distance to the target.

5. A distance measuring apparatus comprising:
means for generating a variable frequency signal;
means for transmitting said variable frequency signal to a target;
means for receiving a return spectrum of said variable frequency signal reflected from said target; and
means for detecting individual frequencies in said return spectrum and providing an output representing target distance for at least the lowest of said detected frequencies, said means for detecting comprising,
analog-to-digital converting means for converting the reflected variable frequency signal to a digital output, and
a Fast Fourier Transform means for converting the digital output to individual frequency outputs each representative of distance to the target.

6. The apparatus of claim 5 further including means responsive to said detecting means for displaying said detected frequency outputs as separate target distances.

7. A distance measuring apparatus comprising:
means for providing a modulating signal;
means responsive to said modulating signal for generating a variable frequency signal;
means for transmitting said variable frequency signal to a target;
means for receiving a return spectrum of said variable frequency signal reflected from said target;
means for mixing a portion of said variable frequency signal with said received reflected signal to produce a beat frequency spectrum, said means for modulating being operated to produce a constant beat frequency;
means for detecting individual beat frequencies in said spectrum and providing outputs representing target distance for each detected beat frequency; and
means responsive to the individual frequency outputs for controlling said means for modulating so that the lowest frequency return of said return spectrum produces said constant beat frequency.

8. The apparatus of claim 7 further including a means responsive to said detecting means for displaying said detected beat frequency outputs as separate target distances.

9. A process for providing nearest return tracking in an FMCW radar comprising:
transmitting an FMCW radar signal to a target;
receiving a reflected return spectrum of said FMCW signal from said target;
transforming said return spectrum from the time domain to the frequency domain by a Fast Fourier Transform;
providing an output representing at least the lowest frequency of the transformed return spectrum; and
displaying the frequency output as a measure of distance to the target.

10. A process for providing nearest return tracking in an FMCW radar comprising:
transmitting an FMCW radar signal to a target;
receiving a reflected return spectrum of said FMCW signal from said target;
mixing a portion of the transmitted and received signal to create a beat frequency;
transforming said return spectrum from the time domain to the frequency domain by a Fast Fourier Transform;
providing an output representing at least the lowest frequency of the transformed return spectrum; and
controlling the transmitted signal to produce a preselected constant beat frequency when said transmitted signal is mixed with the lowest frequency of the return spectrum.

* * * * *